United States Patent
Jardine et al.

(10) Patent No.: US 7,128,782 B2
(45) Date of Patent: Oct. 31, 2006

(54) SULFATE DISPERSION CHROMATE REDUCER

(75) Inventors: Leslie A. Jardine, Salem, MA (US); Charles R. Cornman, Maynard, MA (US); David T. Geary, Hingham, MA (US); Vijay Gupta, Woburn, MA (US); Byong-Wa Chun, Newton, MA (US)

(73) Assignee: W.R. Grace & Co.-Conn., Columbia, MD (US)

( * ) Notice: Subject to any disclaimer, the term of this patent is extended or adjusted under 35 U.S.C. 154(b) by 36 days.

(21) Appl. No.: 10/890,476

(22) Filed: Jul. 13, 2004

(65) Prior Publication Data

US 2005/0109243 A1    May 26, 2005

(51) Int. Cl.
*C04B 22/14*    (2006.01)
(52) U.S. Cl. .................. 106/730; 106/733; 106/823
(58) Field of Classification Search ............. 106/823, 106/713, 730, 733
See application file for complete search history.

(56) References Cited

U.S. PATENT DOCUMENTS

| | | | |
|---|---|---|---|
| 2,897,090 A * | 7/1959 | Van Dam | |
| 3,773,671 A * | 11/1973 | Hussain | |
| 3,843,380 A * | 10/1974 | Beyn | |
| 4,011,092 A | 3/1977 | Yue | 106/89 |
| 4,209,335 A * | 6/1980 | Katayama et al. | |
| 4,268,486 A | 5/1981 | Noack et al. | 210/721 |
| 4,367,213 A | 1/1983 | Florucci et al. | 423/607 |
| 4,572,739 A | 2/1986 | Rasmussen | 106/733 |
| 4,784,691 A * | 11/1988 | Rasmussen | |
| 4,804,399 A * | 2/1989 | Albrecht et al. | 71/93 |
| 4,943,323 A | 7/1990 | Gartner et al. | 106/808 |
| 4,946,505 A * | 8/1990 | Jungk | 106/712 |
| 4,990,190 A | 2/1991 | Myers | 106/727 |
| 5,017,234 A | 5/1991 | Gartner et al. | 106/781 |
| 5,028,350 A * | 7/1991 | Marsek | |
| 5,211,853 A | 5/1993 | Jackson et al. | 210/713 |
| 5,362,321 A * | 11/1994 | Larsen | 106/713 |
| 5,397,478 A | 3/1995 | Pal et al. | 210/710 |
| 6,048,393 A * | 4/2000 | Cheung et al. | 106/727 |
| 6,110,271 A | 8/2000 | Skaggs et al. | 106/804 |
| 6,166,119 A | 12/2000 | Matsuo et al. | 524/376 |
| 6,221,002 B1 | 4/2001 | James | 588/256 |
| 6,620,775 B1 * | 9/2003 | Winston et al. | 510/470 |
| 6,821,507 B1 * | 11/2004 | Glandorf et al. | 424/57 |
| 2003/0056694 A1 | 3/2003 | Macklin et al. | 106/644 |

FOREIGN PATENT DOCUMENTS

| | | |
|---|---|---|
| CH | 534643 | 4/1973 |
| CN | 1084146 A1 | 3/2004 |
| DE | 2309453 * | 9/1974 |
| DE | 29915333 | 5/2000 |
| DE | 29915326 | 7/2000 |

(Continued)

OTHER PUBLICATIONS

Hawley's Condensed Chemical Dictionary, Lewis (1993), Definition of "xanthan" on p. 1233.*

(Continued)

*Primary Examiner*—Paul Marcantoni
(74) *Attorney, Agent, or Firm*—Craig K. Leon

(57) ABSTRACT

A chromium VI reducing composition comprising particles of solid material selected from the group consisting of iron (II) sulfate and tin sulfate, the particles being substantially uniformly dispersed within a liquid carrier. Methods for modifying hydratable cementitious materials using the chromium reducing composition are also disclosed and provide advantages over dry powder or dissolved forms of sulfate compositions when used in cement manufacturing.

14 Claims, 1 Drawing Sheet

Admix Evaluation in Portland Cement

FOREIGN PATENT DOCUMENTS

| | | | |
|---|---|---|---|
| DE | 29915326 | * | 8/2000 |
| DE | 20311049 | * | 10/2003 |
| EP | 0054314 | | 6/1982 |
| EP | 00630869 | | 6/1994 |
| EP | 0960865 | | 12/1999 |
| JP | 48084460 | * | 11/1973 |
| JP | 49010166 | * | 1/1974 |
| JP | 63238172 | * | 10/1988 |
| JP | 6100343 | | 4/1994 |
| JP | 6117098 | | 4/1994 |
| JP | 2001151554 | * | 6/2001 |
| JP | 2001220193 | * | 8/2001 |
| JP | 2003146725 | * | 5/2003 |
| WO | WO 84/02900 | | 8/1984 |
| WO | WO 91/15435 | | 10/1991 |

OTHER PUBLICATIONS

Cynthia J. Paul, et al. "In situ reduction of chromium-contaminated groundwater, soils and sediments by sodium dithionite," *Handbook of Groundwater Remediation Using Permeable Reactive Barriers* (2002).

* cited by examiner

SULFATE DISPERSION CHROMATE REDUCER

FIELD OF THE INVENTION

The present invention relates to the use of reducing agents for hexavalent chromium (VI), and more particularly to a cement additive and method for reducing chromate in cement involving solid sulfate particles dispersed in liquid carrier.

BACKGROUND OF THE INVENTION

Chromium is an unavoidable trace element of the raw material used in the manufacture of cement clinker, which is ground to produce cement. In particular, hexavalent chromium ("Cr VI") may form in the oxidizing and alkaline burning condition of the cement kiln. Cr VI compounds are classified as extremely toxic because of their high oxidation potential and their ability to penetrate human tissue, thereby causing dermal sensitization, allergic reactions, and eczema. As Cr VI compounds have high solubility and are released when cement and water are mixed together, they tend to come into contact with human skin during the handling of wet cement and mortar.

It is desirable to reduce hexavalent chromium (Cr VI) to trivalent chromium (Cr III). This is because Cr III tends to precipitate from solution as a stable complex, thereby posing smaller risks as a serious dermal irritant. Indeed, a number of reducing agents are known. However, they tend to be effective at low pH levels rather than in the high pH environments of cementitious compositions.

Iron (II) sulfate has customarily been used for reducing chromium in cementitious systems. Iron (II) is oxidized to iron (III) in the process of reducing chromium. The actual dosage of Iron (II) sulfate needed for reducing chromium, however, is 10 times the stoichiometric amount required. This is due, in part, to the fact that iron (II) sulfate is added usually in dry form at a dosage of 0.3% to 0.5% (wt) of cement, and may be oxidized by moisture in the air. Moreover, such high addition of iron (II) sulfate in dry form is problematic. For one thing, dry materials are difficult to add accurately in cement milling operations. They also present a dusting problem that is logistically difficult to control, and the health hazards posed by the dust are cause for concern.

Equally significant, the excessive levels of iron sulfate needed are disadvantageous for cementitious systems because they increase water demand for workability, and extend setting time.

Typically, dry iron (II) sulfate cannot be added to cement at a temperature over 80° C., without risking considerable oxidation. As cement exits the mill at temperatures up to 130° C. and sent to storage at temperatures in excess of 80° C., iron (II) sulfate must be added in the later stages of the cement manufacturing and distribution process. Most often, iron (II) sulfate must be added just before the cement is packaged for shipment. This necessitates a further quality control step to check for chromium levels in the cement, and is inconvenient and costly for the cement manufacturer.

As an alternative to iron (II) sulfate, stannous (tin) sulfate can be employed as a chromium reducer. The required dosages of solid stannous sulfate are much lower than that of iron II sulfate (~0.02% wt of cement). It is believed to be somewhat easier to use and to be more heat resistant and storage stable when combined with cement in the milling process. Still, however, there are similar logistical concerns with adding stannous sulfate as a dry powder into the cement milling operation.

Although stannous sulfate is water soluble, it quickly loses dosage efficiency when added as an aqueous solution to cement. The actual amount of stannous sulfate needed is at least double the amount that is required when stannous sulfate is added as a powder. Such a disparity precludes the use of stannous sulfate in solution form as a matter of economics.

Accordingly, in view of the foregoing disadvantages, the present inventors believe that a novel chromium reducing agent is needed that would require relatively low dosage addition rates and could be delivered and dispensed in liquid form.

SUMMARY OF THE INVENTION

In contrast to the solubilized or dry powder forms of iron (II) sulfate and tin sulfate as used in the prior art, the present invention provides a plurality of solid sulfate salt particles that are believed to be more convenient to dispense and more resistant to oxidation. An exemplary composition of the invention thus comprises a plurality of solid particles comprising iron (II) sulfate, tin sulfate, or a mixture thereof, the particles being substantially uniformly dispersed within a liquid carrier.

In one preferred composition, the liquid carrier is an aqueous dispersion comprising sulfate particles (e.g., tin) and a viscosity modifying agent (VMA). Examples of VMAs include welan gum, xanthan gum, diutan gum, and cellulose ethers. In another preferred composition, the liquid carrier may comprise an alkanolamine, such as triethanolamine, triisopropanolamine, diethanolamine, and their salt forms; and the liquid carrier may optionally include water. It is believed that high levels of sulfate salt can be contained within liquid compositions of the invention because, where water is incorporated as or as part of the liquid carrier, the sulfate salt can be contained simultaneously both in solid particle and dissolved form.

The use of a liquid carrier offers greater accuracy and convenience when compared to dry materials. In addition, a liquid product offers greater advantages in terms of environmental health and safety, because it eliminates the opportunity for human inhalation of chemical dusts. Moreover, the use of a liquid carrier leads to dosage efficiencies for stannous sulfate which are no less than those of dry stannous sulfate addition, while providing the advantages of liquid addition.

Exemplary methods of the invention for reducing chromium in cement comprises introducing into the clinker intergrinding operation the aforementioned liquid composition containing sulfate particles dispersed within a liquid carrier. Alternatively, the sulfate dispersions of the invention may be added, in the manner of admixture compositions, to cement and cementitious compositions such as concrete, masonry mortar, gypsum, shotcrete and the like. The present invention also provides a cementitious composition that comprises a hydratable cement binder and the afore-mentioned liquid composition.

Other exemplary methods and compositions of the invention may also include, in addition to the sulfate particle hexavalent chromium ("Cr VI") reducing agent, with optional viscosity modifying agent, at least one or more of the following: (A) at least one additional hexavalent chromium reducing agent (e.g., metal salt); (B) a co-additive comprising an antioxidant, oxygen scavenger, or mixture thereof; (C) at least one cement additive (e.g., an alkanolamine); or (D) mixtures of any of the foregoing.

Further advantages and features of the invention are described in further detail hereinafter.

DETAILED DESCRIPTION OF EXEMPLARY EMBODIMENTS

Figure 1:
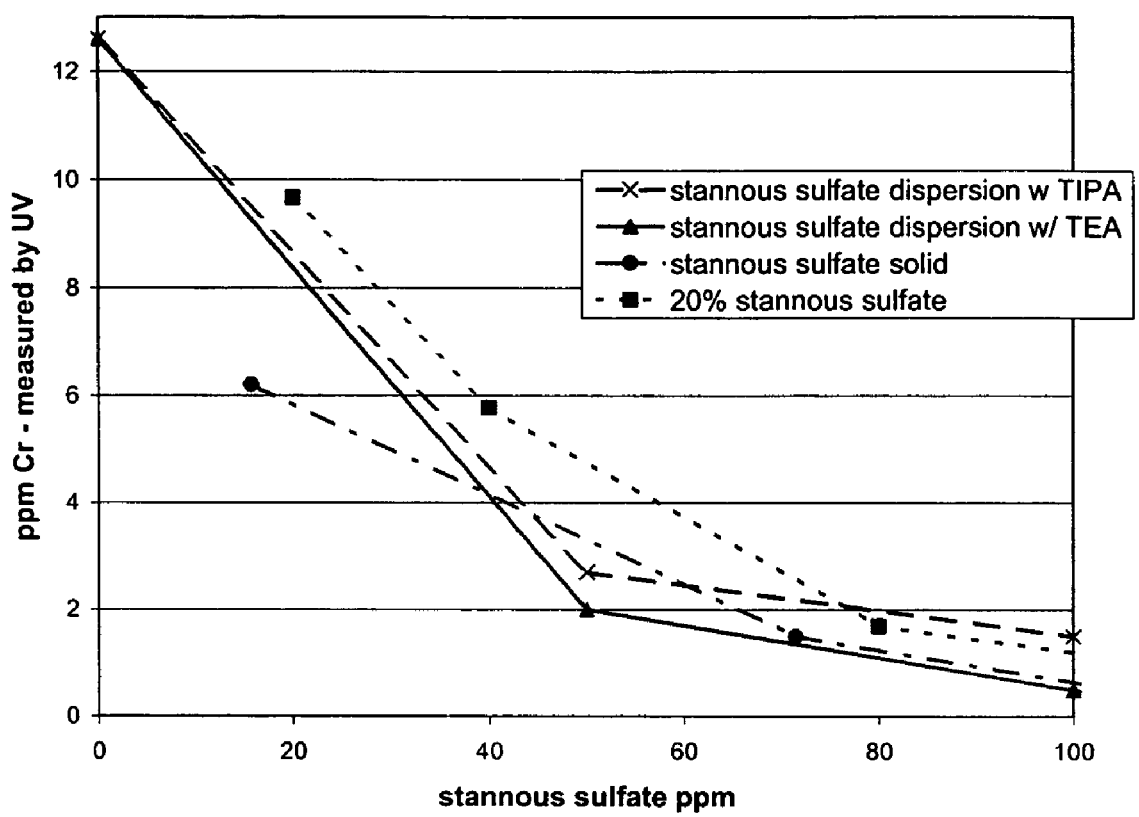
FIG. 1 is a graphic illustration representing chromium reduction using tin (stannous) sulfate in a variety of forms, including a 20% solution (PRIOR ART), dry powder form (PRIOR ART), and two liquid carrier dispersions forms in accordance with the present invention.

The present invention pertains therefore to a liquid-dispensible chromium reducing composition, a method for reducing chromium in cementitious materials, as well as to cementitious materials made by using the chromium reducing composition, as summarized previously.

The term "cement" as used herein means and refers to Portland cement, which, as used in the construction trade, means a hydratable cement produced by pulverizing or intergrinding clinker consisting of calcium silicates usually containing one or more of the forms of calcium sulfate as an interground addition with ASTM types I, II, III, IV, or V. "Cementitious" materials are materials that alone have hydraulic or hydratable cementing properties in that they set and harden in the presence of water. Included in cementitious materials are ground granulated blast-furnace slag (although some air cooled slags may be deemed cementitious as well) and natural cement (e.g., ordinary Portland cement). "Cementitious" materials may also include gypsum (e.g., calcium sulfate hemihydrate), aluminous cement, ceramic cement, oil well drilling cement, and others.

Solid particle sulfate salt dispersions of the invention may be used in the cement manufacturing plant, such as directly into the mill grinder (e.g., ball mill, roller mill), separator, classifier, or into the bag packaging process. The dispersions may also be employed into cement after manufacture and into cementitious compositions, such as concrete, mortar masonry, gypsum fireproofing, shotcrete, and other compositions.

In addition to Portland cement, the term "cement" as used in the present invention may include pozzolans, which are siliceous or aluminosiliceous materials that possess little or no cementitious value (i.e., as a binder) but which will, in finely divided form in the presence of water, chemically react with the calcium hydroxide released by the hydration of Portland cement to form materials with cementitious properties. See e.g., Dodson, V., Concrete Admixtures (Van Nostrand Reinhold, New York 1990), page 159. Diatomaceous earth, limestone, clay (e.g., metakaolin), shale, fly ash, silica fume, and blast furnace slag are some of the known pozzolans. Certain ground granulated blast-furnace slags and high calcium fly ashes possess both pozzolanic and cementitious properties.

The present invention provides a liquid composition comprising solid sulfate salt particles dispersed within a liquid carrier. Such sulfate based additives are believed to be operative to reduce chromium VI into chromium III, and may sometimes be referred to as "chromium reducing agents" herein. Exemplary methods of the invention comprise adding the liquid composition, the sulfate particle chromium reducing agent, to cement clinker during the intergrinding of the clinker to produce hydratable cement.

One exemplary method for making such a liquid composition is to combine a sulfate (e.g., tin, iron (II)) in the form of solid particles with a liquid carrier, such as an aqueous dispersion having at least one viscosity modifying agent (VMA). The VMA renders it possible to create a sulfate salt dispersion that is substantially uniform in concentration, even after a considerable storage period (e.g., 28 days). The viscosity modifying agent (VMA) should provide a sheer thinning characteristic for ease of pumping the liquid dispersions of the invention. Furthermore, the VMA should not interfere with the effect of the cement additive composition in the final application.

The term viscosity modifying agent ("VMA") is used herein to refer either to the agent in its dry concentrated form or to the agent once it is dispersed in water, which makes it a high viscosity liquid. A suitable VMA in high viscosity liquid form, believed particularly suitable for purposes of the present invention, is commercially available from Grace Construction Products, Cambridge, Mass., under the tradename V-MAR® 3. This VMA is based on diutan gum (obtained from CP Kelco), and contains water as well as a dispersant, such as may be obtained from Grace under the ADVA® brand name.

Other viscosity modifying agents (VMAs) may be employed in the present invention. These include but are not limited to: (a) biopolymer polysaccharides selected from the group consisting of welan gum, diutan gum, xanthan, rhamsan, gellan, dextran, pullulan, curdlan, and derivatives thereof; (b) marine gums selected from the group consisting of algin, agar, carrageenan, and derivatives thereof; (c) plant exudates selected from the group consisting of locust bean, gum arabic, gum Karaya, tragacanth, Ghatti, and derivatives thereof; (d) seed gums selected from the group consisting of guar, locust bean, okra, psyllium, mesquite, and derivatives thereof; (e) starch-based gums selected from the group consisting of ethers, esters, and derivatives thereof (See e.g., U.S. 6,1110,271 at Column 3, lines 38–46); and mixtures thereof; and (f) associative thickeners selected from the group consisting of hydrophobically modified alkali swellable acrylic copolymer, hydrophobically modified urethane copolymer, associative thickeners based on polyurethanes, cellulose (e.g., hydroxyethyl cellulose, carboxymethylhydroxyethylcellulose), polyacrylates, and polyethers.

Tin sulfate has a solubility of 330 g/l at 25° C. (See e.g., Encyclopedia of Chemical Technology, $4^{th}$ ed. Vol. 24, pg. 129). The present invention permits tin sulfate to be loaded into a liquid carrier at concentrations that are higher than would normally be achieved by solubilizing the sulfate in water alone. For example, when solid particle tin sulfate is dispersed in a mixture of water and a viscosity modifier, it is possible to obtain a 56% by total weight of tin sulfate dispersion, wherein 35% of the tin sulfate will be dispersed as a solid and 21% will be dissolved in solution. This represents a dramatic increase in the amount of tin sulfate conveyed in liquid form.

Other exemplary liquid carriers for suspending the tin sulfate or iron sulfate include alkanolamines, which can be nonaqueous or, if water is additionally employed, partly aqueous in nature. Examplary alkanolamines include as triethanolamine, triisopropanolamine, diethanolamine, and their salt forms.

Exemplary chromate reducing liquid compositions of the invention comprise: chromate reducing actives in the form of solid tin sulfate particles (average particle size 0.001 to 1.0 microns) in the amount of 40–70% based on total weight of the liquid composition; water in the amount of 5% to 50% based on total weight of the liquid composition; and a biopolymer polysaccharide viscosity modifying agent selected from the group consisting of diutan and xanthan, said biopolymer polysaccharide being present in the amount of 0.1% to 10% based on total weight of the liquid composition.

Other exemplary compositions of the invention, in addition to iron (II) sulfate or tin (II) sulfate, may further comprise other chromium reducing agents (e.g., metal salts) including, but not limited to, stannous chloride, manganese sulfate, iron sulfide, and/or ferrous chloride.

Further exemplary embodiments of the invention, in addition to the sulfate particles in dispersion, may further comprise at least one cement additive comprising an alkanolamine, glycol, sugar, chloride salt, or mixture thereof. The optional cement additive or additives may be used in an amount of 5% to 80% based on total weight of the liquid composition.

In further exemplary compositions and methods of the invention, the inventors contemplate that it is possible to coat or encapsulate the solid iron (II) sulfate and/or tin sulfate particles with a material that renders the particles more resistant to oxidation, that does not prevent them from being substantially uniformly dispersed in the aforementioned liquid carriers, and that does not inhibit their efficacy as chromium reducing agents in a cementitious composition. Exemplary encapsulant or coating materials may include a polysaccharides, starches, carbohydrates, or modified forms thereof, polyethylene; and other polymeric materials.

Other exemplary methods of the invention, in addition to the sulfate based hexavalent chromium reducing agent, further comprise introducing a an antioxidant, oxygen scavenger, or mixtures thereof, as a co-additive to the cement clinker, before or during said grinding, in a sulfate agent:co-additive ratio, of 99.5:0.5 to 20:80; more preferably in a ratio of 99:1 to 50:50; and most preferably in a ratio of 95:5 to 60:40.

Preferably, although not necessarily, the sulfate based chromium reducing agent salt and optional co-additive (antioxidant and/or oxygen scavenger) are both dispensed in the same liquid additive composition. Less preferably, the co-additive can be added separately, such as before, during, or after the grinding of the clinker cement.

Thus, the amount of total co-additive (antioxidant and/or oxygen scavenger), whether added in combination or separately, should be 0.05 to 80.0%, more preferably 0.5 to 50.0%, and, most preferably, 1.0 to 30.0%, these percentages based on total weight of the liquid additive composition.

As used herein, the term "antioxidant" means and refers to compositions, materials, or compounds which, especially when incorporated into the liquid additive composition containing the aforementioned sulfate-based chromium(VI)-reducing agent, decreases the rate of oxidation or otherwise reduces the undesirable effects of oxidation upon the hexavalent chromium reducing agent. For example, U.S. Pat. No. 5,211,875 disclosed antioxidants believed to be suitable for the present invention, such as 2,6-di(t-butyl)-4-methylphenol(BHT), 2,2'-methylene-bis(6-t-butyl-p-cresol), triphenylphosphite, tris-(nonylphenyl)phosphite and dilaurylthiodipropionate. It is also believed that other antioxidants, such as sulfur dioxide, trihydroxy butyrophenone, and butylated hydroxy anisole, as taught in U.S. Pat. No. 6,465,065 would also be suitable for use in the present invention. As mentioned above, such antioxidants can be incorporated with the sulfate in the same liquid additive composition, or, less preferably, added separately into the cement or cement clinker before, during, or after grinding. Amounts of antioxidants used should preferably be in the range of 0.05 to 80%, more preferably in the amount of 0.5 to 50%, and most preferably 1.0 to 30.0%, based on total weight of the liquid additive composition (if incorporated into the composition). If added separately from the liquid additive, the amount of antioxidant may be 0.1 ppm to 1000 ppm, more preferably 1.0–300 ppm, and most preferably 5–100 ppm (parts per million based on dry cement weight).

As used herein, the term "oxygen scavenger" means and refers to compositions, materials or compounds which, when included in the liquid additive composition comprising the sulfate-based CrVI reducing agent, can remove oxygen, such as (a) by reacting or combining with entrapped oxygen, or (b) by catalyzing an oxidation reaction yielding innocuous products.

Exemplary oxygen scavengers useful as co-additives in the present invention include, but are not limited to, (a) a compound containing an ethylenically unsaturated hydrocarbon (b) a phenolic or salt or derivative thereof; (d) a hydroxylamine or hydrazine or derivative thereof, (e) a sulfurous acid or salt or derivative thereof; (f) a transition metal complex; or mixtures thereof.

One class of exemplary oxygen scavenging compositions is composed of ethylenically unsaturated hydrocarbons. The ethylenically unsaturated hydrocarbon may be used by themselves or with a transition metal catalyst. The ethylenically unsaturated hydrocarbon may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule.

Preferred examples of unsubstituted ethylenically unsaturated hydrocarbons include, but are not limited to, diene polymers such as polyisoprene, (e.g., transpolyisoprene), polybutadiene (especially 1,2-polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as beta-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. The composition used may also comprise a mixture of two or more of the substituted or unsubstituted ethylenically unsaturated hydrocarbons described above.

As mentioned above, the ethylenically unsaturated hydrocarbons may be used, in many cases, advantageously with a transition metal catalyst. While not being bound by any particular theory, suitable metal catalysts are those that can readily interconvert between at least two oxidation states. See Sheldon, R. A.; Kochi, J. K.; "Metal-Catalyzed Oxidations of Organic Compounds" (Academic Press, New York 1981). Preferably, the transition metal catalyst is in the form of a salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal, when introduced into liquid additive or into the cement, is not necessarily that of the active form. The metal is preferably iron, nickel or copper, more preferably manganese, and most preferably cobalt. Suitable counterions for the metal include, but are not limited to, chloride, acetate, stearate, palmitate, 2-ethylhexanoate, neodecanoate or naphthenate.

A preferred class of substituted ethylenically unsaturated co-additives includes enediols. Commercial examples of enediols include ascorbic acid and erythorbic acid and their salts (e.g., sodium ascorbate, sodium erythorbate) or derivatives. Any stereoisomer of these compounds can be effective in the current invention. Alkali and alkaline earth metal salts, such as potassium or sodium ascorbic acid/ascorbate, are preferred.

Further exemplary embodiments, wherein enediols are used, comprise activators for enhancing the oxygen scavenging ability of enediols. For example, U.S. Pat. No. 4,524,015 discloses the use of a granular mixture of an ascorbate or ascorbic acid, an alkali metal carbonate, an iron compound, carbon black, and water. Accordingly, these are believed to be useful enediol activators.

Further exemplary methods and compositions of the invention may include activating agents for the enediol-containing compounds, such as a transition metal compound, complex or chelate. More preferred are transition metals chosen from the group comprising iron, copper, cobalt, or nickel. Most preferred is iron or copper. The transition metal may preferably be supplied either (1) as a compound. Such as an ordinary salt, or (2) as a polyalkylpolyamine ("PAPA") chelate, macrocyclic amine ("macrocycle") chelate, or an amino polycarboxylate chelate of a transition metal ion. It is also possible to utilize other transition metal chelates which contain one or more amine, hydroxyl, carboxylate or sulfhydryl groups, or combinations thereof.

Metal catalysts may include simple transition metal salts such as ferrous or ferric chloride, cuprous or cupric chloride, ferrous or cupric sulfate, ferrous gluconate, nickel sulfate, or cobalt chloride, which is more preferable, and cupric sulfate, which is most preferred. The chelated-transition metal amines are particularly useful as metal catalysts used with ascorbates because, when utilized in the appropriate amounts, they possess oxygen scavenging properties that augment the oxygen scavenging properties of ascorbates, thus making the metal chelate a secondary scavenging compound. Also, the transition metal ion in the complex can catalyze the oxygen scavenging activity of ascorbates. Of the chelated ion complexes, the polyalkylpolyamines are preferable; more preferable are those which have symmetrical-length carbon chains between adjacent nitrogen atoms, and most preferable are those wherein each such chain comprises between one and four, and optimally two, carbon atoms. Transition metal chelates of ethylene diamine tetracetic acid ("EDTA") can also be used, such as $Fe^{++}/EDTA/(2Na^+)$.

Further exemplary oxygen scavengers thus may include transition metal complexes by themselves (e.g., apart from use with enediols as discussed above). Such materials have been developed by Aquanautics, Inc., Alameda, Calif. (See Packaging Technology, "Oxygen Eliminator Extends Shelf Life," 1989 and "Extending the Life of a Bottle of Beer," New York Times, Mar. 29, 1989). These materials are particularly (but not exclusively) those complexes formed between transition metals and so-called polyalkylamines as described in U.S. Pat. No. 4,959,135 which is incorporated herein by reference, as well as those complexes formed between transition metals and "macrocyclic amines" as described in U.S. Pat. No. 4,952,289, which is also incorporated herein by reference.

These transition metal complexes can bind oxygen and be used as oxygen scavengers in the present invention. Such complexes either do not form or do not become activated (i.e., cannot, or do not, bind oxygen) until the amine and metal are together exposed to water or water vapor.

Without being wished to be bound by theory, the inventors believe that the co-additives (antioxidant and/or oxygen scavenger) may work beneficially by way of one or more of the following mechanisms. First, the co-additive can act as a classic antioxidant/oxygen scavenger whereby any oxidizing agent (molecular oxygen or otherwise) that enters a liquid carrier medium containing the CrVI reducing agent, reacts preferentially with the co-additive, thereby sparing the sulfate-based CrVI reducing agent and any other metal salt CrVI reducing agent employed. This effectively provides for a longer shelf-life for the sulfate0based CrVI reducing agent and other metal salt reducing agent before they are added to the cement grinding mill or to the ground cement.

The inventors also believe that this same mechanism is at work after the sulfate based CrVI reducing liquid composition has been added to the cement. As adventitious moisture and molecular oxygen permeate the treated cement, the oxygen will be scavenged by the co-additive before it reacts with the sulfate based CrVI reducing agent. To this end, it is preferred that the sulfate based CrVI reducing agent, and optional further metal salt and/or co-additive (antioxidant and/or oxygen scavenger) are pre-mixed into a single liquid additive.

The inventors also believe that co-additives containing an antioxidant and/or oxygen scavenger can react to regenerate any chromium reducing sulfates or other metal salt reducing agents that have decomposed, through inadvertent reaction with adventitious molecular oxygen (or other unwanted oxidizing agents), thereby maintaining the level of the sulfate reducing agent or any other reducing agents employed. This mechanism may operate before the liquid additive composition is added to cement, during storage of the finished cement, or when the finished cement is used for making mortar or concrete.

The inventors further believe that the co-additive containing an antioxidant and/or oxygen scavenger may form an adduct with the CrVI-reducing agent (sulfate-based agent and any other metal salts) or with an oxidized form thereof, e.g., tin (IV), which is itself an active CrVI reducing agent.

A further embodiment involves combining the sulfate reducing agent and the above-described co-additive (antioxidant and/or oxygen scavenger) with one or more agents that are beneficial to the manufacture of cement. Such agents include cement grinding aids such as glycols, glycerols, amines, alkanolamines, and known cement quality improvers such as sodium chloride, calcium nitrate, calcium nitrite, sugars, and others. Glycols and glycerols are believed to improve the storage stability of stannous salts. The mechanism for this benefit is unknown, but this could involve a decrease in the activity of molecular oxygen in the presence of glycols or glycerols.

Other exemplary co-additives comprise phenolics which can serve as oxygen scavengers, such as a quinone and hydroxyl forms thereof, including but not limited to hydroquinone (p-dihydroxybenzene), pyrocatechol (o-dihydroxybenzene), and derivatives thereof.

Still further exemplary oxygen scavenging co-additives comprise hydroxylamine, hydrazine, or a salt or derivative thereof. An exemplary hydroxylamine has a structure represented by the formula

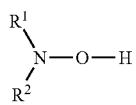

wherein $R^1$ and $R^2$ each comprise a hydrogen or $C_1$–$C_{18}$ alkyl, alkene, or aryl group. An exemplary hydrazine has a structure represented by the formula

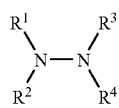

wherein $R^1$, $R^2$, $R^3$, and $R^4$ each comprise a hydrogen or $C_1$–$C_{18}$ alkyl, alkene, or aryl group. Exemplary hydroxylamine salts include hydroxylamine hydrochloride ($NH_2OH \cdot HCl$) and hydroxylamine sulfate (($NH_2OH)_2 \cdot H_2SO_4$); while exemplary hydrazine salts include hydrazine hydrochloride ($N_2H_4 \cdot HCl$ or $N_2H_4 \cdot 2HCl$) and hydrazine sulfate ($N_2H_4 \cdot H_2SO_4$).

An exemplary hydroxyalkylhydroxylamine has the formula HO—N—$CH_2$—[CH(OH)—R]$_2$ wherein R is selected from the group consisting of H and $C_1$ to $C_{10}$ alkyl; wherein the initial rate of reaction between said hydroxyalkylhydroxylamine and dissolved oxygen is more than about 1.5 times the initial rate of reaction between dissolved oxygen and the corresponding non-hydroxylated alkylhydroxylamine. Another hydroxyalkylhydroxylamine is selected from the group consisting of N,N,-bis (2-hydroxyethyl) hydroxylamine, N,N-bis(2-hydroxypropyl) hydroxylamine, and N,N-bis(2-hydroxybutyl) hydroxylamine.

Further exemplary oxygen scavenger co-additives comprise a sulfurous acid or a salt thereof, such as a sulfite, bisulfite, or thiosulfite. Thus, for example, an alkali metal salt can be incorporated into the liquid additive composition, alongside the sulfate based chromium reducing agent, in the form of an alkali metal salt such as sodium sulfite or bisulfite, or potassium sulfite or bisulfite.

In other exemplary embodiments of the invention, a sulfite may be used in combination with other co-additives. For example, U.S. Pat. No. 4,384,972 discloses the use of a salt of a metal, an alkali substance, a sulfite or other deliquescent compound, and, optionally, ascorbic acid or a salt thereof.

More preferably, exemplary methods and liquid additive compositions of the present invention comprise the use of sulfate based chromium reducing agent and two or more co-additives comprising an antioxidant, oxygen scavenger, or mixture thereof. Accordingly, a preferred method of the invention comprises introducing at least two antioxidants and/or oxygen scavengers to cement clinker during the intergrinding thereof. For example, an ascorbic acid and sulfite may be used in combination (or their salts and derivatives). As another example, a phenolic and hydroxylamine (or their salts and derivative) can be used in combination. Preferably, these combinations are added along with the sulfate based chromium reducing agent in the same liquid additive composition, but it is believed that they could also be added to the cement before, during, or after the cement clinker grinding operation.

The following examples and embodiments are provided by way of illustration only, and are not intended to limit the scope of the invention but rather to enable the practice of various modifications by those ordinary skilled in view of the disclosures herein.

EXAMPLE 1

A tin sulfate composition of the invention was formulated by mixing together tin sulfate particles (56 gm), and a diutan gum based VMA (44 gm). This VMA is commercially available from Grace Construction Products under the tradename V-MAR® 3. Other suitable VMAs could include xanthan gum, welan gum, and cellulose ethers, preferably dispersed in water using optional dispersants.

Table 1 shows a performance comparison between tin sulfate solid, tin sulfate dispersion, and tin sulfate solution. All additives were interground into a slag cement prepared in a laboratory ball mill. The proportions of materials in the cement prepared in the laboratory are as follows: 70% clinker, 25% slag, 2.8% gypsum, 1.9% plaster. The grinds were prepared at ambient temperature.

The chromate reducing additives were added at the dosages described in Table 1. The dosage for the active stannous sulfate portion is also given. Soluble ppm Cr (measured as chromate) is given for the cold grind as prepared, as well a portion of the grind that was heat treated at 180° C. for 2 hrs. The purpose of heat treating the grind is to determine the relative resistance of the Cr reducing agent to ambient oxidation, and, hence, its effectiveness after cement storage.

With lower measured soluble chromium values, the stannous sulfate in the dispersion appears to match the dosage efficiency of the dry powder form, and to exceed the dosage efficiency of the solution form of the stannous sulfate.

The amount of chromium in terms of parts per million (PPM) is determined by UV measurement of the cement pore water. Soluble chromate can be identified by UV peaks at 277 nm and 375 nm. Calibration is made with a potassium dichromate solution. Cement pore water was obtained by creating a cement paste with a cement to water ratio of 2:1. After 9 minutes of mixing, the cement paste is allowed to sit until it is aged for a total of 30 minutes. The paste is centrifuged, and the supernatant is decanted and filtered to obtain the pore water. (BDL in the attached table means 'below detection limit' (<0.5 ppm)).

TABLE 1

| Chromate reducing Additive | Additive (Ppm) | Tin Sulfate (ppm) | Cold Grind Ppm Cr | Heat Treated Ppm Cr |
|---|---|---|---|---|
| None | — | — | 8 | 9 |
| Stannous sulfate powder | 40 | 40 | 3 | 4 |
| 56% stannous sulfate dispersion | 71 | 40 | BDL | BDL |
| 20% stannous sulfate solution | 400 | 80 | 2 | 6 |
| Stannous sulfate powder | 100 | 100 | BDL | BDL |
| 56% stannous sulfate dispersion | 179 | 100 | BDL | BDL |
| 20% stannous sulfate solution | 1000 | 200 | BDL | 6 |

EXAMPLE II

A similar experiment was done using a cement having the following percentages of components: 95% clinker, 2.8% gypsum, 1.9% plaster. The respective performances in terms of chromate reduction for the samples are illustrated in Table 2 below.

TABLE 2

| Chromate Reducing Additive | Additive (ppm) | Tin Sulfate (ppm) | Cold Grind (ppm) Cr | Heat Treated (ppm) Cr |
|---|---|---|---|---|
| 56% stannous sulfate dispersion | 179 | 100 | 14 | 18 |
| 56% stannous sulfate dispersion | 357 | 200 | 1 | 5 |
| 20% stannous sulfate solution | 1000 | 200 | 9 | 19 |
| 20% stannous sulfate solution | 2000 | 400 | BDL | 1 |

EXAMPLE III

Another experiment was run using a cement having the following component percentages: 65% clinker, 7.5% slag, 15.1% limestone, 7.5% natural pozzolon, 2.8% gypsum, and 1.9% plaster, the percentages being given in terms of total weight. In this case 200 ppm tin sulfate delivered in the dispersion matched the performance of 300 ppm tin sulfate delivered in a solution, in the heat treated cement. Results are shown in Table 3 below.

TABLE 3

| Chromate Reducing Additive | Additive Ppm | Tin Sulfate ppm | Cold Grind ppm Cr | Heat Treated Ppm Cr |
|---|---|---|---|---|
| None | | | 8 | 8 |
| 56% stannous sulfate dispersion | 357 | 200 | 2 | 3 |
| 20% stannous sulfate solution | 1500 | 300 | 3 | 3 |

EXAMPLE IV

A further experiment was run with a cementitious composition formulation having the following component percentages: 96% clinker, 2.4% gypsum, 1.5% plaster. Comparing tin sulfate delivered as solid, liquid, and dispersion, the performance of tin sulfate delivered as a dispersion clearly equals performance of the solid, whereas the 200 ppm tin sulfate delivered in a solution does not reduce chromate to the same extent.

TABLE 4

| Chromate Reducing Additive | Additive ppm | Tin Sulfate ppm | Cold Grind ppm Cr | Heat Treated Ppm Cr |
|---|---|---|---|---|
| None | — | — | 8 | 9 |
| 56% stannous sulfate dispersion | 357 | 200 | BDL | BDL |
| 20% stannous sulfate solution | 1000 | 200 | 5 | 8 |
| Stannous sulfate powder | 200 | 200 | BDL | BDL |

EXAMPLE V

Tin sulfate may also be suspended as dry particles within a liquid carrier comprising at least one alkanolamine. The dosage efficiency of the tin sulfate, in terms of chromate reduction, was found to be greater than that of a tin sulfate solution and to be roughly comparable to tin sulfate in dry powder form.

A tin sulfate dispersion was formulated using the following components: water (20 g), stannous sulfate (34 g), and triisopropanolamine (46 g). Another dispersion could be formulated by substituting diethanolisopropanolamine.

Both alkanolamines were also used in formulations wherein iron (II) sulfate was substituted for stannous sulfate, and were found effective at decreasing the required dosage of iron sulfate by 20–30%, but the suspensions assumed a dark and sludgy appearance.

Table 5 blow shows the results of an experiment in a cement with the following proportions: 96% clinker, 2.4% gypsum, 1.5% plaster. Materials for this experiment were prepared and evaluated the same way they were for the series of experiments for the liquid carriers (aqueous dispersions) made by using VMAs. It was observed that the samples involving 50 ppm tin sulfate and 71 ppm tin sulfate in solution did not match the performance of tin sulfate dispersed in the triisopropanolamine ("TIPA") liquid carriers (it is also believed that TIPA did not function as chromate reducing agents on their own).

TABLE 5

| Chromate Reducing Additive | Additive Ppm | Tin Sulfate ppm | Cold Grind Ppm Cr | Heat Treated Ppm Cr |
|---|---|---|---|---|
| None | | 0 | 8 | — |
| Stannous sulfate dispersion w/TIPA | 76 | 26 | 2 | 4 |
| Stannous sulfate dispersion w/TIPA | 97 | 33 | 1 | 4 |
| Stannous sulfate dispersion w/TIPA | 147 | 50 | BDL | 1 |
| 20% stannous sulfate solution | 250 | 50 | 3 | 3 |
| 20% stannous sulfate solution | 355 | 71 | 3 | 3 |

EXAMPLE VI

A tin sulfate dispersion was formulated using the following components: water (20 g), stannous sulfate (26 g), and triethanolamine (54 g). This chromate reducing composition was then admixed into a finished cement (manufactured in a grinding mill) as a dry blend just prior to addition of mix water. Cement pore water was obtained, as previously described, and chromate was measured by UV as previously described. The results are plotted as shown in FIG. 1.

The foregoing examples and exemplary embodiments are intended for illustrative purposes only, and not to limit the scope of the invention. Modifications and variations may be envisioned by those of ordinary skill in view of the disclosures contained herein.

We claim:

1. A chromium reducing liquid composition, comprising:
    an aqueous liquid carrier containing tin sulfate simultaneously in both dissolved form and as substantially uniformly dispersed solid particles having an average particle size of 0.001 to 1.0 microns, said substantially uniformly dispersed solid particles being dispersed in said liquid carrier in an amount not less than 40% and not greater than 70% based on total weight of said liquid composition;

said aqueous liquid carrier comprising water in the amount of 5% to 50% based on total weight of said liquid composition;

said aqueous liquid carrier further comprising a biopolymer polysaccharide viscosity modifying agent selected from the group consisting of diutan and xanthan, said biopolymer polysaccharide being present in an amount no less than 0.1% and no greater than 10.0% based on total weight of said chromium reducing liquid composition; and said biopolymer polysaccharide viscosity modifying agent operative to provide a uniformity of concentration of said tin sulfate within said chromium reducing liquid composition, even after storage of said chromium reducing liquid composition after 28 days, a sheer thinning characteristic for ease of pumping said chromium reducing liquid into a cement manufacturing process whereby cement is ground from clinker, said aqueous liquid carrier containing tin sulfate at higher levels than would be normally achieved by dissolving tin sulfate in water alone.

2. The composition of claim 1 further comprising at least one alkanolamine.

3. The composition of claim 2 wherein said alkanolamine is selected from the group consisting of triethanolamine, diethanolamine, triisopropanolamine, and their salt forms.

4. A method for reducing hexavalent chromium, comprising: intergrinding cement clinker with the composition of claim 1.

5. A composition comprising a hydratable cementitious material and the composition of claim 1.

6. The composition of claim 1 wherein said particles are coated with a material operative to render the particles more resistant to oxidation.

7. The composition of claim 1 further comprising, in addition to said sulfate particles, at least one additional hexavalent chromium reducing agent.

8. The composition of claim 7 wherein said at least one additional hexavalent chromium reducing agent is a metal salt.

9. The composition of claim 1 further comprising iron sulfate.

10. The composition of claim 1 further comprising an antioxidant, oxygen scavenger, or mixture thereof.

11. The composition of claim 1 wherein said tin sulfate particles are dispersed in said liquid carrier in an amount no less than 50% and no greater than 60%, based on the dry weight of said composition.

12. The composition of claim 1 further comprising at least one cement additive.

13. A chromium reducing liquid composition, comprising: an aqueous liquid carrier containing tin sulfate simultaneously in both dissolved form and as substantially uniformly dispersed solid particles having an average particle size of 0.001 to 1.0 microns, said solid tin sulfate particles being substantially uniformly dispersed in said liquid carrier in the amount of an amount no less than 40% and no greater than 70% based on weight of said liquid composition;

said aqueous liquid carrier comprising water in the amount of 5% to 50% based on total weight of said liquid composition; and said aqueous liquid carrier further comprising an antioxidant, oxygen scavenger, or mixture thereof;

said aqueous liquid carrier comprising a biopolymer polysaccharide viscosity modifying agent selected from the group consisting of diutan and xanthan, said biopolymer polysaccharide being present in an amount no less than 0.1% and no greater than 10.0% based on total weight of said liquid chromium reducing composition; and said biopolymer polysaccharide viscosity modifying agent being operative to provide a uniformity of concentration of said tin sulfate within said chromium reducing liquid composition, even after storage of said chromium reducing liquid composition after 28 days, a sheer thinning characteristic for ease of pumping said chromium reducing liquid into a cement manufacturing process whereby cement is ground from clinker, said aqueous liquid carrier containing tin sulfate at higher levels than would be normally achieved by dissolving tin sulfate in water alone.

14. A chromium reducing liquid composition, comprising: an aqueous liquid carrier containing tin sulfate simultaneously in both dissolved form and as substantially uniformly dispersed solid particles having an average particle size of 0.001 to 1.0 microns, said substantially uniformly dispersed solid tin sulfate particles being dispersed in said liquid carrier in the amount of an amount no less than 40% and no greater than 70% based on total weight of said liquid composition;

said aqueous liquid carrier comprising water in the amount of 5% to 50% based on total weight of said liquid composition;

said aqueous liquid carrier further comprising at least one cement additive selected from the group consisting of an alkanolamine, glycol, sugar, and chloride salt; and said aqueous liquid carrier comprising a biopolymer polysaccharide viscosity modifying agent selected from the group consisting of diutan and xanthan, said biopolymer polysaccharide being present in an amount no less than 0.1% and no greater than 10.0% based on total weight of said liquid chromium reducing composition; and said biopolymer polysaccharide viscosity modifying agent operative to provide a uniformity of concentration of said tin sulfate within said chromium reducing liquid composition even after storage of said chromium reducing liquid composition after 28 days, a sheer thinning characteristic for ease of pumping said chromium reducing liquid into a cement manufacturing process whereby cement is ground from clinker, said aqueous liquid carrier containing tin sulfate at higher levels than would be normally achieved by dissolving tin sulfate in water alone.

* * * * *